US011100099B2

(12) United States Patent
Uchibe et al.

(10) Patent No.: US 11,100,099 B2
(45) Date of Patent: Aug. 24, 2021

(54) DATA ACQUISITION DEVICE, DATA ACQUISITION METHOD, AND RECORDING MEDIUM

(71) Applicant: HITACHI, LTD., Tokyo (JP)

(72) Inventors: Konagi Uchibe, Tokyo (JP); Misa Sato, Tokyo (JP); Kohsuke Yanai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 16 days.

(21) Appl. No.: 16/813,860

(22) Filed: Mar. 10, 2020

(65) Prior Publication Data
US 2021/0004367 A1 Jan. 7, 2021

(30) Foreign Application Priority Data

Jul. 2, 2019 (JP) .............................. JP2019-123544

(51) Int. Cl.
*G06F 16/245* (2019.01)
*G06F 16/22* (2019.01)
(Continued)

(52) U.S. Cl.
CPC ........ *G06F 16/245* (2019.01); *G06F 16/2282* (2019.01); *G06F 16/313* (2019.01); *G06F 16/33* (2019.01)

(58) Field of Classification Search
CPC .... G06F 16/2282; G06F 16/245; G06F 16/30; G06F 16/31; G06F 16/313; G06F 16/33
See application file for complete search history.

(56) References Cited

U.S. PATENT DOCUMENTS

| 5,950,196 A * | 9/1999 | Pyreddy ................. G06F 16/81 715/227 |
| 2016/0012091 A1* | 1/2016 | Zoryn ................. G06F 16/9558 707/706 |

(Continued)

FOREIGN PATENT DOCUMENTS

| JP | 2007310503 A | * 11/2007 |
| JP | 2017-207853 A | 11/2017 |

(Continued)

OTHER PUBLICATIONS

Wei et al., Table extraction for answer retrieval, 2006, Information Retrieval, Issue 9, pp. 589-611. Springer Nature B.V. (Nov. 2006), http://dx.doi.org/10.1007/s10791-006-9005-5 (Year: 2006).*

*Primary Examiner* — James E Richardson
(74) *Attorney, Agent, or Firm* — Volpe Koenig

(57) ABSTRACT

A data acquisition device is accessible to correspondence information that defines correspondence between an attribute keyword indicating an attribute and a non-attribute keyword that does not indicate the attribute, and is configured to execute: specifying the attribute keyword corresponding to the non-attribute keyword when the search keyword is the non-attribute keyword with respect to each of a plurality of search keywords; assigning the search keyword to a character string in a retrieval target document corresponding to the search keyword; extracting a specific table assigned with the annotation from one or more tables; selecting at least one of a specific row and a specific column relevant to each of the plurality of search keywords from rows and columns that constitute the specific table extracted on the basis of the annotation; and acquiring a cell in the specific table specified by a first selection result.

13 Claims, 11 Drawing Sheets

(51) Int. Cl.
*G06F 16/33* (2019.01)
*G06F 16/31* (2019.01)

(56) References Cited

U.S. PATENT DOCUMENTS

2017/0329749 A1* 11/2017 Milward ............... G06F 40/166
2019/0102620 A1*  4/2019 Siddiq ................ G06K 9/00469
2019/0171704 A1*  6/2019 Buisson ............. G06K 9/00449
2019/0340240 A1* 11/2019 Duta .................... G06F 40/177

FOREIGN PATENT DOCUMENTS

JP           6480380 B2 *  3/2019
JP        2020194460 A  * 12/2020
WO       2014/002601 A1     1/2014

* cited by examiner

108 — C1                C4

| COMPANY A |           | X%            | aaaa YEN       |
|           | SEGMENT A | SEE ATTACHMENT | SEE ATTACHMENT |
| COMPANY B |           | Y%            | bbbb YEN       |
| COMPANY C |           | Z%            | cccc YEN       |
|           |           | TAX RATE :    | 5%             |

L3 — (rows), D34 (right column group)

| C1 | C4 |
|---|---|
| COMPANY A | aaaa YEN |
|  | SEE ATTACHMENT |
| COMPANY B | bbbb YEN |
| COMPANY C | cccc YEN |
|  | 5% |

COMPANY NAME → C1 column
SALES → C4 column
L2, L5

(B) 1602

| C1 | C4 |
|---|---|
| COMPANY A | aaaa YEN |
| COMPANY B | bbbb YEN |
| COMPANY C | cccc YEN |

*FIG. 16*

| Japanese character strings | English translations |
|---|---|
| という | refer(s) to |
| をいう | refer(s) to |
| 追加型投資とは、追加が行われるファンドをいう。 | An additional investment trust refers to funds that is added. |
| 場合 | case |
| ケース | case |
| 追加型投資の場合 | in the case of additional investment trusts |
| すること | to do something |
| 何度でも追加購入することが可能である。 | it is possible to purchase additionally as many times. |
| 追加が行われるファンドをいう | THIS REFERS TO FUNDS THAT IS ADDED |
| 国内資産を源泉とするものをいう | THIS REFERS TO PRODUCTS SOURCED FROM DOMESTIC ASSETS |
| 株式を源泉とするものをいう | THIS REFERS TO PRODUCTS SOURCED FROM STOCKS |

Row labels: 1701, 1702, 1703, 1704, 1705, 1706, 1707, 1708, 1709, 1710, 1711

*FIG. 17*

DATA ACQUISITION DEVICE, DATA ACQUISITION METHOD, AND RECORDING MEDIUM

CLAIM OF PRIORITY

The present application claims priority from Japanese patent application JP 2019-123544, filed on Jul. 2, 2019, the content of which is hereby incorporated by reference into this application.

BACKGROUND

The present invention relates to a data acquisition device, a data acquisition method, and a recording medium for acquiring data.

PCT International Publication No. WO2014/002601 discloses a table information recognition system that estimates a relationship between table elements that constitute tables included in a document from sentences in the document. In the table information recognition system, a document input unit receives the input of a document including sentences and tables, a table structure estimation unit estimates a table structure such as headlines and content description fields, a table element-relevant text extraction unit extracts a table element-relevant text relevant to a character string (a table element) in the cells of tables from the sentences, and an inter-table-element relationship estimation unit estimates a relationship between table elements included in the table element-relevant text by referring to a conceptual structure relationship estimation rule database.

Japanese Unexamined Patent Application, Publication No. 2017-207853 discloses a table cell retrieval device that acquires cell knowledge using knowledge outside a tale and retrieves a reply to a retrieval query. In the table cell retrieval device, a table-relevant information extraction unit extracts table-relevant information, a intra-table knowledge extraction unit extracts cell knowledge made up of a set of table-relevant information and intra-table information including entities, attributes, and attribute values extracted from table-format data on the basis of the table-relevant information and classification results and stores the extracted cell knowledge in a retrieval database, a query analysis unit assigns a label to a keyword corresponding to an attribute in a retrieval query with respect to a keyword set or a natural sentence which is a given retrieval query, and a knowledge retrieval unit outputs cell knowledge corresponding to the retrieval query from the retrieval database on the basis of the retrieval query assigned with the label.

SUMMARY

However, in the above-described conventional technique, when a headline that defines the meaning of rows or columns of a table is missing in the table or when the headline is not sufficient although the headline is present such as a case in which a plurality of cells are combined, there is a problem that it is not possible to acquire necessary data from the table.

A disclosure enables to acquire necessary data from a table appropriately.

An aspect of the disclosure in this application is a data acquisition device including a processor configured to execute a program and a storage device configured to store the program, wherein the processor is accessible to correspondence information that defines correspondence between an attribute keyword indicating an attribute and a non-attribute keyword that does not indicate the attribute, and the processor is configured to execute: a specifying process of specifying the attribute keyword corresponding to the non-attribute keyword by referring to the correspondence information when the search keyword is the non-attribute keyword with respect to each of a plurality of search keywords; an assigning process of assigning the search keyword to a character string in a retrieval target document corresponding to the search keyword as an annotation and assigning the attribute keyword to a character string in the retrieval target document corresponding to the attribute keyword specified by the specifying process as the annotation; an extraction process of extracting a specific table assigned with the annotation by the assigning process from one or more tables present in the retrieval target document; a first selection process of selecting at least one of a specific row and a specific column relevant to each of the plurality of search keywords from rows and columns that constitute the specific table extracted by the extraction process on the basis of the annotation; and an acquisition process of acquiring a cell in the specific table specified by a first selection result selected by the first selection process.

According to the disclosure, it is possible to acquire necessary data from a table appropriately.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 15 is an explanatory diagram illustrating data acquisition example 1 of the acquisition process (step S1005).

FIG. 16 is an explanatory diagram illustrating data acquisition example 2 of the acquisition process (step S1005).

FIG. 17 is a table illustrating Japanese character strings and their English translations.

DETAILED DESCRIPTION OF THE EMBODIMENT

Data Acquisition Example

Figure 1:
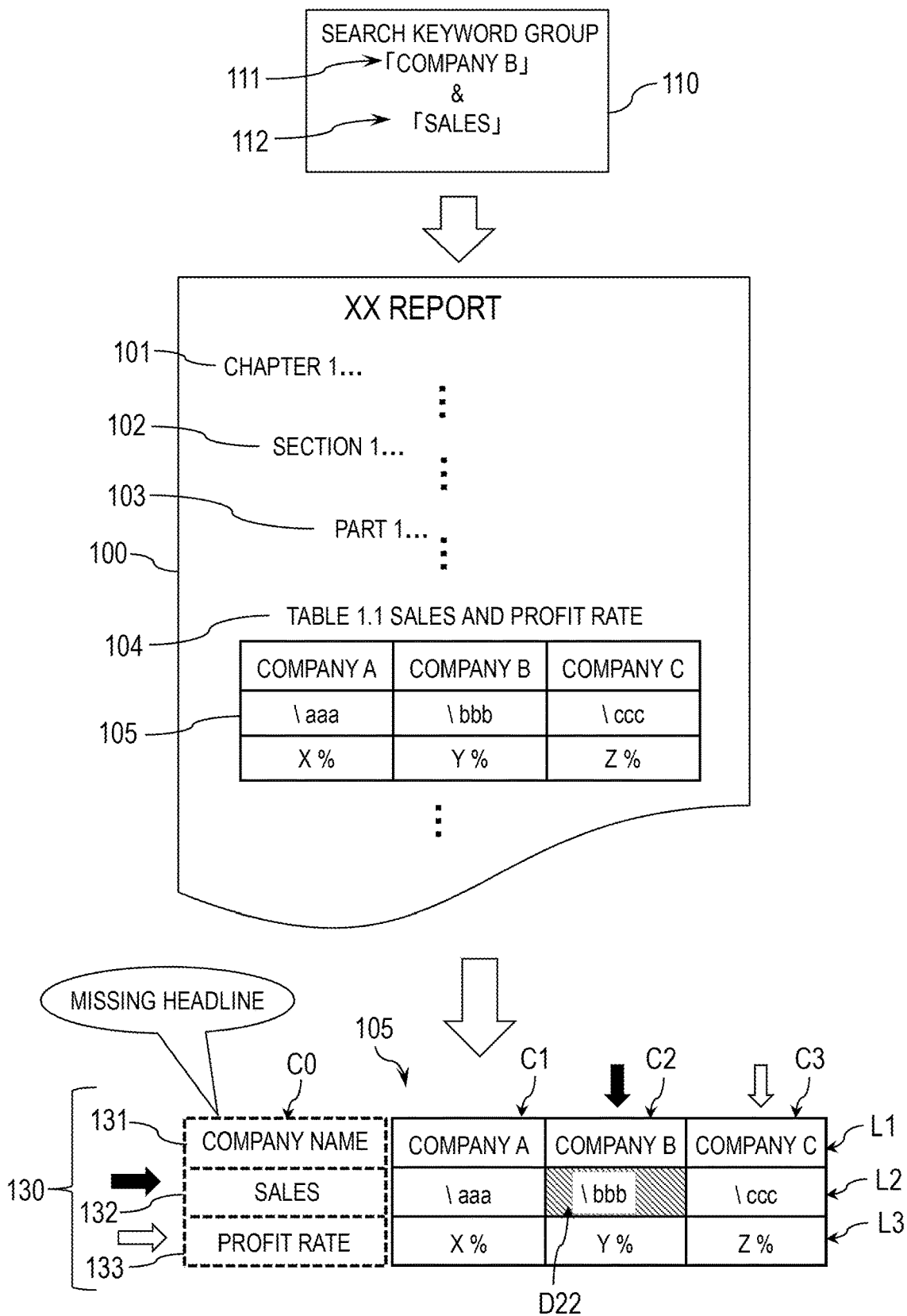
FIG. 1 is an explanatory diagram illustrating an example of a data acquisition process of a data acquisition device according to the present embodiment.

FIG. 1 is an explanatory diagram illustrating an example of a data acquisition process of a data acquisition device according to the present embodiment. The data acquisition device retrieves table data (hereinafter simply referred to as a table) 105 included in an electronic document (hereinafter simply referred to as a document) 100 using a keyword group 110 and acquires desired data corresponding to the keyword group from the table.

The search keyword group 110 includes a plurality of keywords. For example, the search keyword group 110 includes a search keyword 111 (sometimes denoted as company B 111) which uses a proper noun indicating a company name of "Company B" as a character string and a search keyword 112 (sometimes denoted as sales 112) indicating an attribute covering a detailed amount of money such as "Sales". The search keyword 111 is not a search keyword indicating an attribute, and therefore a non-attribute keyword.

The document 100 has a hierarchical structure including a chapter, a section, and a part, for example. A sentence (not illustrated) is described in each of the chapter, the section, and the part. Moreover, a table is present in a sentence having any hierarchical structure. In FIG. 1, the table 105 is present in Part 1 of Section 1 of Chapter 1. The chapter, the section, and the part each have character strings indicating the titles of the chapter, the section, and the part, respectively. For example, the document 100 has a character string 101 indicating the title of Chapter 1, a character string 102 indicating the title of Section 1, and a character string 103 indicating the title of Part 1. Moreover, a character string 104 indicating the title of the table 105 is also present near the table 105 (for example, above or below the table 105).

The table 105 is data represented by a matrix structure of m rows and n columns (m and n are integers of 1 or more). For example, in Extensible Markup Language (XML), a description surrounded by table tags is data indicating a table, and a description surrounded by tr tags in the table tag indicates row data of the table. The data of the m-th row is the data in the m-th tr tag. A td tag in the tr tag indicates an element of each row, and a description surrounded by the n-th td tags of the data in each tr tag is the n-th data. Therefore, a description in the n-th td tag in the m-th tr tag can be recognized as the data of the cell of the m-th row and the n-th column. The table 105 may not be surrounded by a ruled line as long as the table can be expressed in the above-described manner.

In FIG. 1, the table 105 is made up of three rows (rows L1 to L3) and three columns (columns C1 to C3). A cell at which a row Lm and a column Cn cross each other is defined as a cell Dmn. When a document creator creates a table, for example, the document creator uses the left-end column of the table as a headline and inputs values corresponding to the attribute items in the headline to the right side of the column of the headline. Moreover, there may be a table in which such a headline is missing. A headline 130 is missing in the table 105 in FIG. 1.

Therefore, the data acquisition device of the present embodiment retrieves the document 100 using the search keyword group 110 so that a character string of a cell Dmn corresponding to the search keyword group 110 can be acquired from the table 105 in which the headline 130 is missing or the headline 130 is not sufficient.

For example, the data acquisition device retrieves the document 100 including the character strings 101 to 104 and a character string in the table 105 in which the headline 130 is missing and specifies that a table relevant to the search keyword group 110 is the table 105. Moreover, the data acquisition device specifies a row L2 relevant to the search keyword 112 of "Sales". Moreover, the data acquisition device specifies a column C2 relevant to the search keyword 111 of "Company B" among the columns C1 to C3 orthogonal to the row L2. The data acquisition device acquires a character string "¥bbb" in a cell D22 at which the row L2 and the column C2 cross each other.

In this manner, the data acquisition device searches a table in which the headline 130 is missing as if the headline 130 including the company name 131 and the sales 132 indicating the attributes of the search keyword group 110 is present as a column C0 to acquire a character string in the cell D22. Therefore, it is possible to acquire necessary data from the table 105 appropriately regardless of the presence of the headline 130 in the table 105.

Moreover, a case in which a column C0 of the headline 130 is present in the table 105 will be considered. Some cells of a cell group that constitutes the column C0 may be combined by taking the human visual recognition into consideration. For example, when the cell of sales 132 and the cell of profit rate 133 are combined, it is unclear whether the sales 132 and the profit rate 133 each correspond to the row L2 or L3. Moreover, a coined word "sales profit rate" which connects the sales 132 and the profit rate 133 may be considered to indicate one attribute.

As described above, when the meaning of an attribute indicated by the headline 130 or a row corresponding to the row Lm is unclear even if the headline 130 is present, it is difficult for a computer to recognize to which row Lm the combined cell corresponds. Due to this, the headline 130 including the combined cell is an insufficient headline.

In the data acquisition device of the present embodiment, even when an insufficient headline 130 is present in the table 105, similarly to when the headline 130 is missing, the table 105 is searched and a character string in the cell D22 is acquired as if the headline 130 that defines the company name 131, the sales 132, and the profit rate 133 as attributes is present as the column C0. Therefore, it is possible to acquire necessary data from a table appropriately regardless of the clarity of the headline 130 in the table 105.

Hardware Configuration Example of Data Acquisition Device

Figure 2:
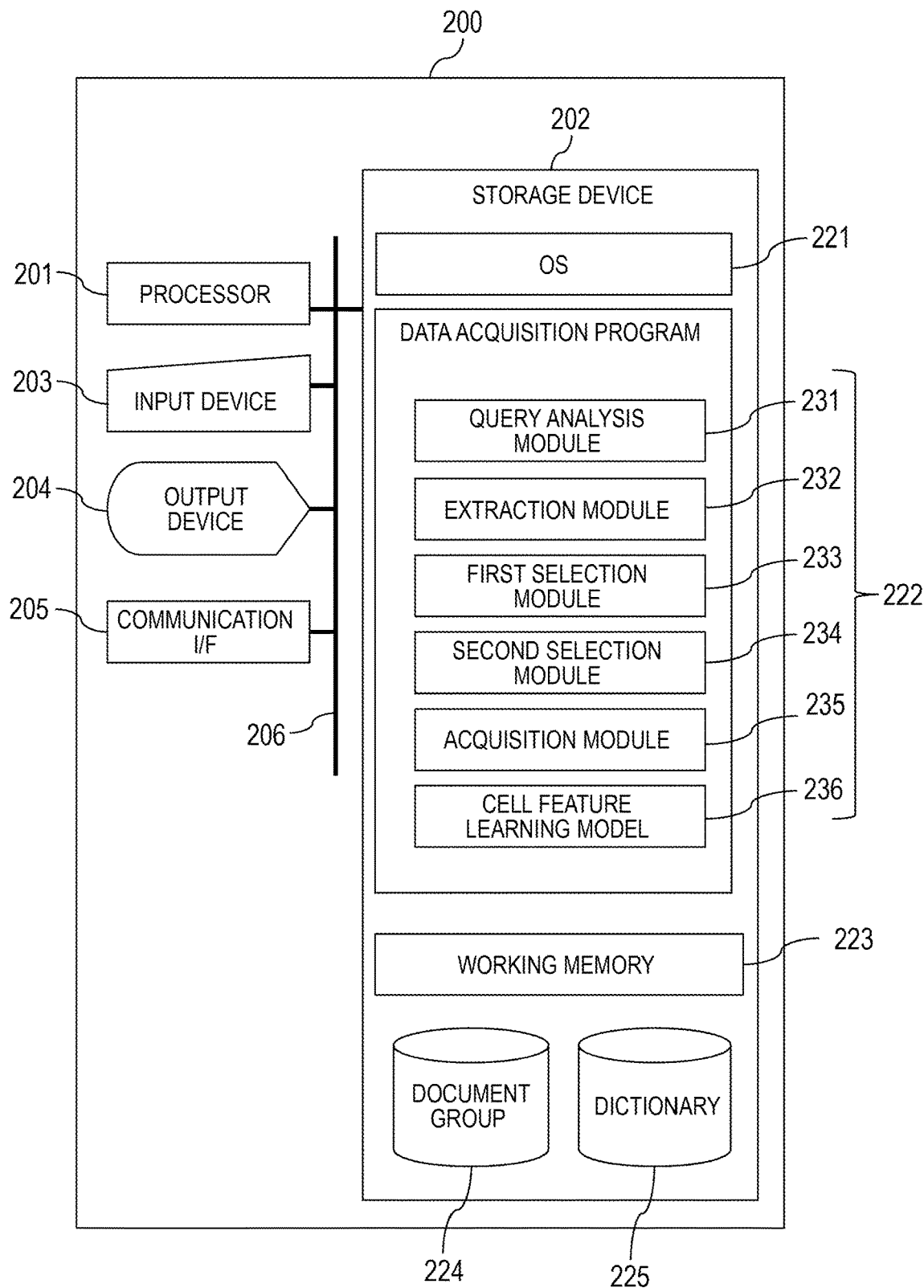
FIG. 2 is a block diagram illustrating a hardware configuration example of the data acquisition device.

FIG. 2 is a block diagram illustrating a hardware configuration example of the data acquisition device. A data acquisition device 200 includes a processor 201, a storage device 202, an input device 203, an output device 204, and a communication interface (communication I/F) 205. The processor 201, the storage device 202, the input device 203, the output device 204, and the communication I/F 205 are connected by a bus 206.

The processor 201 controls the data acquisition device 200. The storage device 202 is a nontransitory or transitory recording medium that stores various programs and data, and for example, is a ROM (Read Only Memory), a RAM (Random Access Memory), a HDD (Hard Disk Drive), and a flash memory.

The storage device 202 stores an OS (Operating System) 221, a data acquisition program 222, a working memory 223, a document group 224, and a dictionary 225. The OS 221 controls the entire data acquisition device 200. The data acquisition program 222 is a program that causes a processor to execute the data acquisition process illustrated in FIG. 1. The data acquisition program 222 includes a query analysis module 231, an extraction module 232, a first selection module 233, a second selection module 234, an acquisition module 235, and a cell feature learning module 236 as software modules.

The query analysis module 231 is a software module that analyzes a retrieval query to extract a search keyword. The extraction module 232 is a software module that extracts a table relevant to the search keyword from a document. The first selection module 233 is a software module that selects a row or a column (a first selection result) relevant to the search keyword from the table extracted by the extraction module 232.

The second selection module 234 is a software module that selects a row or a column (a second selection result) relevant to the non-attribute keyword 111 and orthogonal to the row or column selected by the first selection module 233. The acquisition module 235 is a software module that acquires a character string in the cell Dmn from a cell at which the first selection result of the first selection module 233 and the second selection result cross each other. The cell feature learning module 236 is a module that learns features of cells that constitute the table.

The working memory 223 is a storage area where the processor 201 works. The document group 224 is a data set of one or more documents 100. The dictionary 225 is an example of correspondence information that defines correspondence between an attribute keyword and a non-attribute keyword.

The input device 203 inputs data. Examples of the input device 203 include a keyboard, a mouse, a touch panel, a numeric keypad, a scanner, and a microphone. The output device 204 outputs data. Examples of the output device 204 include a display, a printer, and a speaker. The communication I/F 205 connects to a network and transmits and receives data to and from a destination computer.

Figure 3:
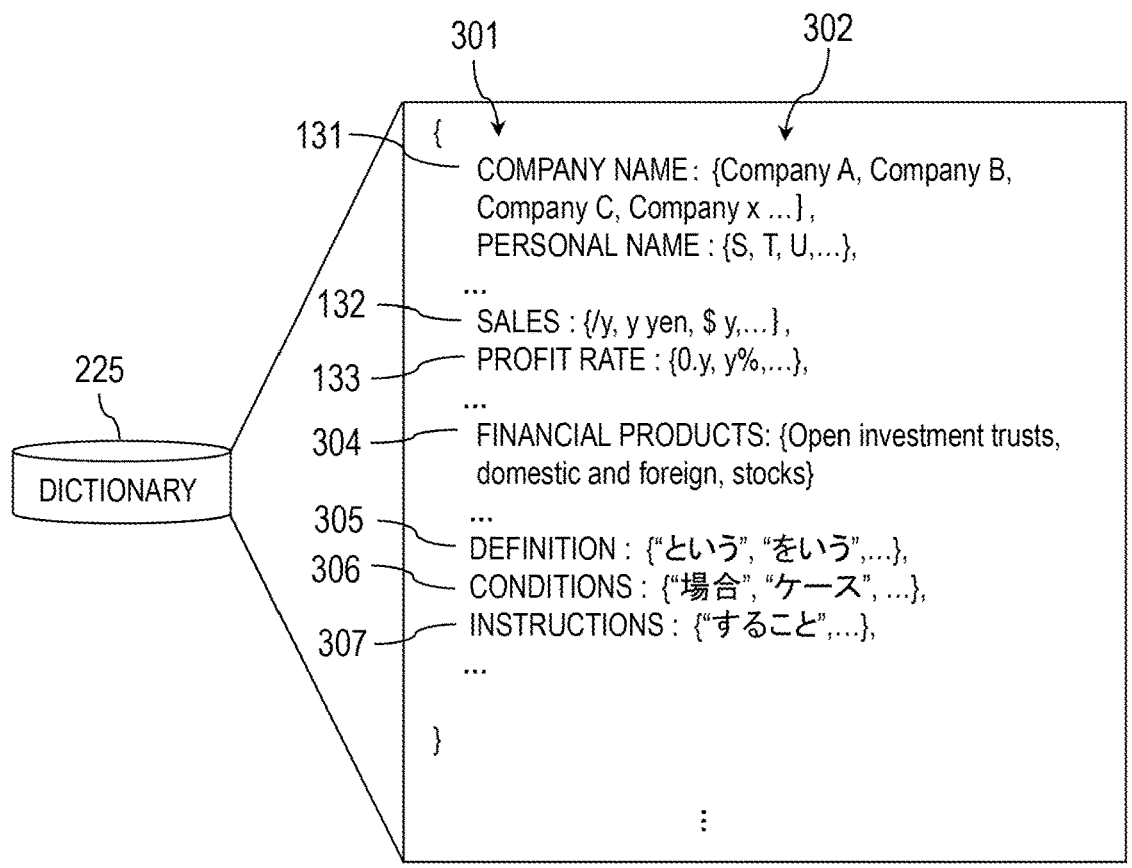
FIG. 3 is an explanatory diagram illustrating an example of the dictionary illustrated in FIG. 2.

FIG. 3 is an explanatory diagram illustrating an example of the dictionary 225 illustrated in FIG. 2. The dictionary 225 correlates an attribute keyword 301 and a non-attribute keyword 302 with each other. For example, the attribute keyword 301 includes attribute including the company name 131, a personal name, the sales 132, the profit rate 133, a financial product 304, a definition 305, a condition 306, and an instruction 307, for example.

The non-attribute keyword 302 includes Company A, Company B, Company C, and Company x, for example, for the company name 131. The Company A, the Company B, and the Company C are proper nouns. The x in the Company x is a wildcard. More specifically, when "Corporation x" is defined as the non-attribute keyword 302, for example, a character string including "Corporation" at the end of its name can be correlated with the company name 131. Moreover, when "Corporation x" is defined as the non-attribute keyword 302, a character string including "Corporation" at the start of its name can be correlated with the company name 131.

Although the non-attribute keyword 302 of the sales 132 and the profit rate 133 is a number y, y may be an arbitrary number and may be a certain range of numbers.

The definition 305 is correlated with the non-attribute keyword 302 such as a Japanese character string 1701 in FIG. 17 that means "refer(s) to" and a Japanese character string 1702 in FIG. 17 that means "refer(s) to". For example, in the case of a Japanese character string 1703 in FIG. 17 that means "An additional investment trust refers to funds that is added.", since this character string includes the Japanese character string 1702 that means "refer(s) to" which is the non-attribute keyword 302, the attribute of the character string is the definition 305.

The condition 306 is correlated with the non-attribute keyword 302 such as a Japanese character string 1704 in FIG. 17 that means "case" and a Japanese character string 1705 in FIG. 17 that means "case". For example, in the case of a character string a Japanese character string 1706 in FIG. 17 that means "in the case of additional investment trusts", since this character string includes the Japanese character string 1704 that means "case" which is the non-attribute keyword 302, the attribute of the character string is the condition 306.

The instruction 307 is correlated with the non-attribute keyword 302 of a Japanese character string 1707 in FIG. 17 that means "to do something". For example, in the case of a character string a Japanese character string 1708 in FIG. 17 that means "it is possible to purchase additionally as many times.", since the character string includes the Japanese character string 1707 that means "to do something" which is the non-attribute keyword 302, the attribute of the character string is the instruction 307.

Figure 4:
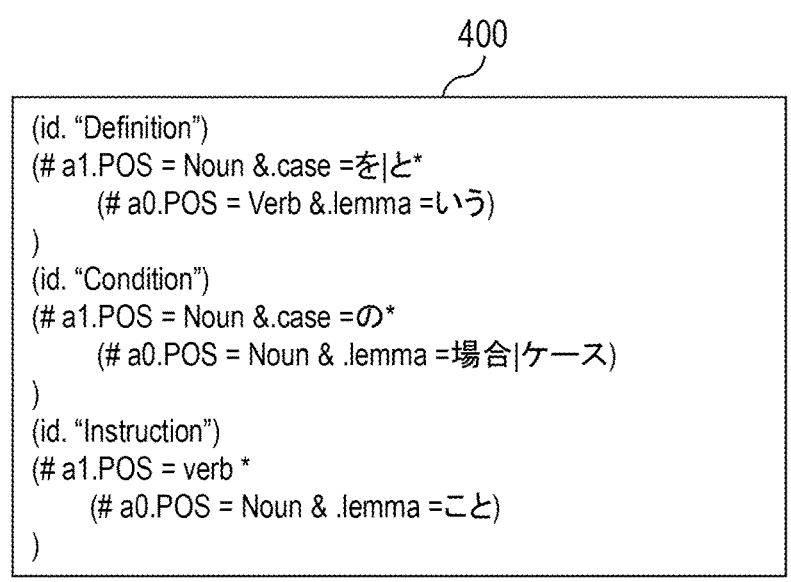
FIG. 4 is an explanatory diagram illustrating an example of a dependency pattern.

FIG. 4 is an explanatory diagram illustrating an example of a dependency pattern. A dependency pattern 400 is an example of correspondence information that defines a correspondence between the attribute keyword and the non-attribute keyword 302. The dependency pattern 400 defines contents equivalent to the definition 305, the condition 306, and the instruction 307 defined in the dictionary 225. The dependency pattern 400 is included in the query analysis module 231, for example.

Annotation Assignment Example

Next, an annotation assignment example will be described. An annotation (footnote) is the attribute keyword 301 assigned to a character string relevant to the search keyword in the document 100. The assignment of the annotation is executed by the query analysis module 231. In the following annotation assignment example, although an example of using the dictionary 225 is described, the same is applied when the dependency pattern 400 is used.

Figure 5:
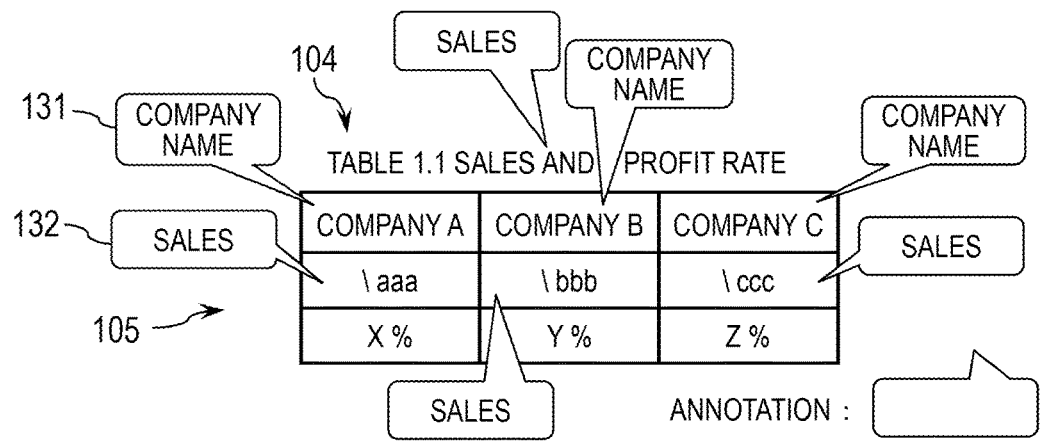
FIG. 5 is an explanatory diagram illustrating Annotation assignment example 1.

FIG. 5 is an explanatory diagram illustrating Annotation assignment example 1. FIG. 5 is an example in which an annotation is assigned to the table 105 using the search keyword group 110. The Company B 111 is the non-attribute keyword 302 and corresponds to the company name 131 which is the attribute keyword 301 in the dictionary 225. Therefore, the company name 131 is also treated as the search keyword 111.

The "Company A" in the table 105 corresponds to the company name 131 which is the attribute keyword 301 serving as the search keyword 111 in the dictionary 225. Therefore, the company name 131 which is the attribute keyword 301 is assigned to "Company A" in the table as an annotation. The same is applied to the "Company C" in the table. The "Company B" in the table is identical to the Company B 111. Therefore, the company name 131 which is the attribute keyword 301 is assigned to the "Company B" in the table as an annotation.

"¥aaa" in the table 105 corresponds to the sales 132 which is the attribute keyword 301 in the dictionary 225 when "¥aaa" is included in "¥y" which is the non-attribute keyword 302 in the dictionary 225. Therefore, the sales 132 which is the attribute keyword 301 is assigned to "¥aaa" in the table as an annotation. The same is applied to "¥bbb" and "¥ccc".

Any of "X %", "Y %", and "Z %" in the table 105 is not identical to the search keywords 111 and 112. Moreover, none of them corresponds to the company name 131 which is the attribute keyword 301 corresponding to the "Company B" of the search keyword 111. Furthermore, none of them corresponds to the sales 132 which is the attribute keyword 301 in the dictionary 225. Therefore, an annotation is not assigned to "X %", "Y %", and "Z %" in the table.

"Table 1.1 Sales and profit rate" is the character string 104 indicating the title of the table 105. "Sales" in the character string 104 is identical to the sales 132 which is the attribute keyword 301 in the dictionary 225. Therefore, the sales 132 which is the attribute keyword 301 is assigned to the character string 104 as an annotation. Although not illustrated in the drawing, the character strings indicating the titles of a chapter, a section, and a part such as the character string 101 indicating the title of Chapter 1, the character string 102 indicating the title of Section 1, and the character string 103 indicating the title of Part 1 are processed in a manner similar to the above.

Figure 6:
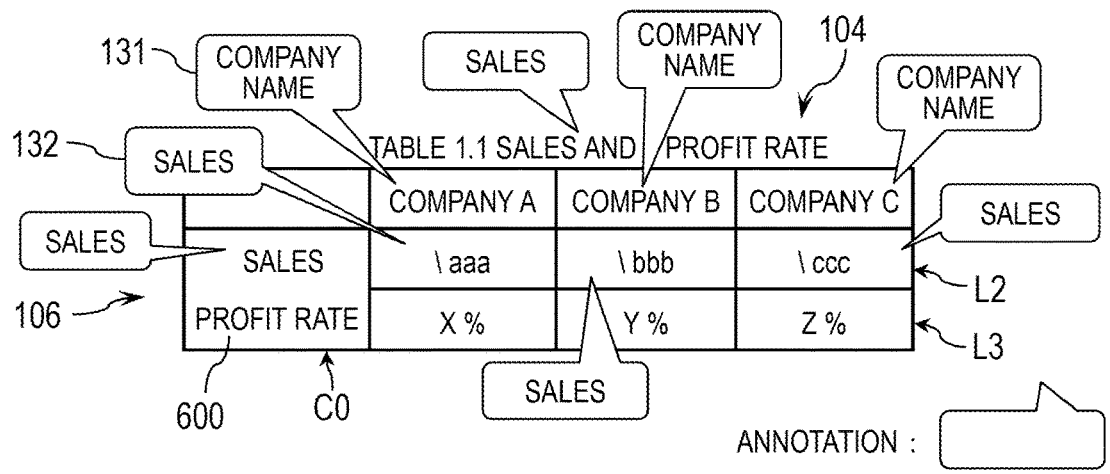
FIG. 6 is an explanatory diagram illustrating Annotation assignment example 2.

FIG. 6 is an explanatory diagram illustrating Annotation assignment example 2. FIG. 6 is an example in which an annotation is assigned to a table 106 using the search keyword group 110. The table 106 is a table in which a headline column C0 is added to the left end of the table 105. However, a cell 600 is a combined cell of two cells, and a character string of "Sales" and a character string of "Profit rate" are present at the upper and lower ends, respectively. Therefore, it is unclear whether headline names of the rows L2 and L3 are no headline, "Sales", "Profit rate", or "Sales profit rate".

Since a character string of "Sales" is present in the cell 600, the character string is identical to the sales 132 which is the attribute keyword 301 in the dictionary 225. Therefore, the sales 132 which is the attribute keyword 301 is assigned to the character string 104 as an annotation. Since the annotation assignment illustrated in FIG. 5 is similarly applied to the other cells in which a character string is present, the description thereof will be omitted.

Figure 7:
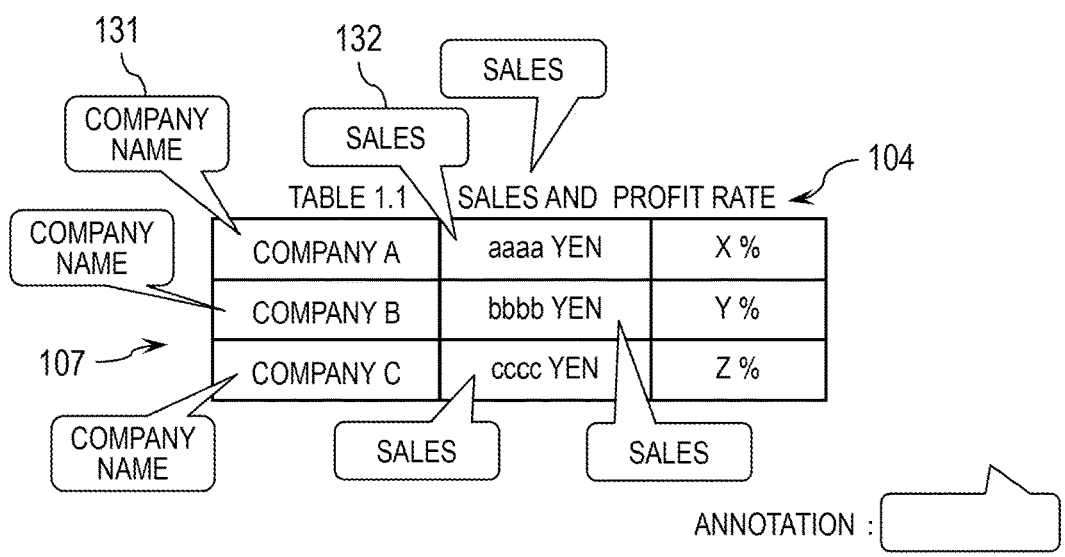
FIG. 7 is an explanatory diagram illustrating Annotation assignment example 3.

FIG. 7 is an explanatory diagram illustrating Annotation assignment example 3. FIG. 7 is an example in which an annotation is assigned to a table 107 using the search keyword group 110. The table 107 is a table in which the rows and columns of the table 105 are interchanged. Even when the rows and columns are interchanged, the annotations assigned are the same as those of the table 105.

Figure 8:
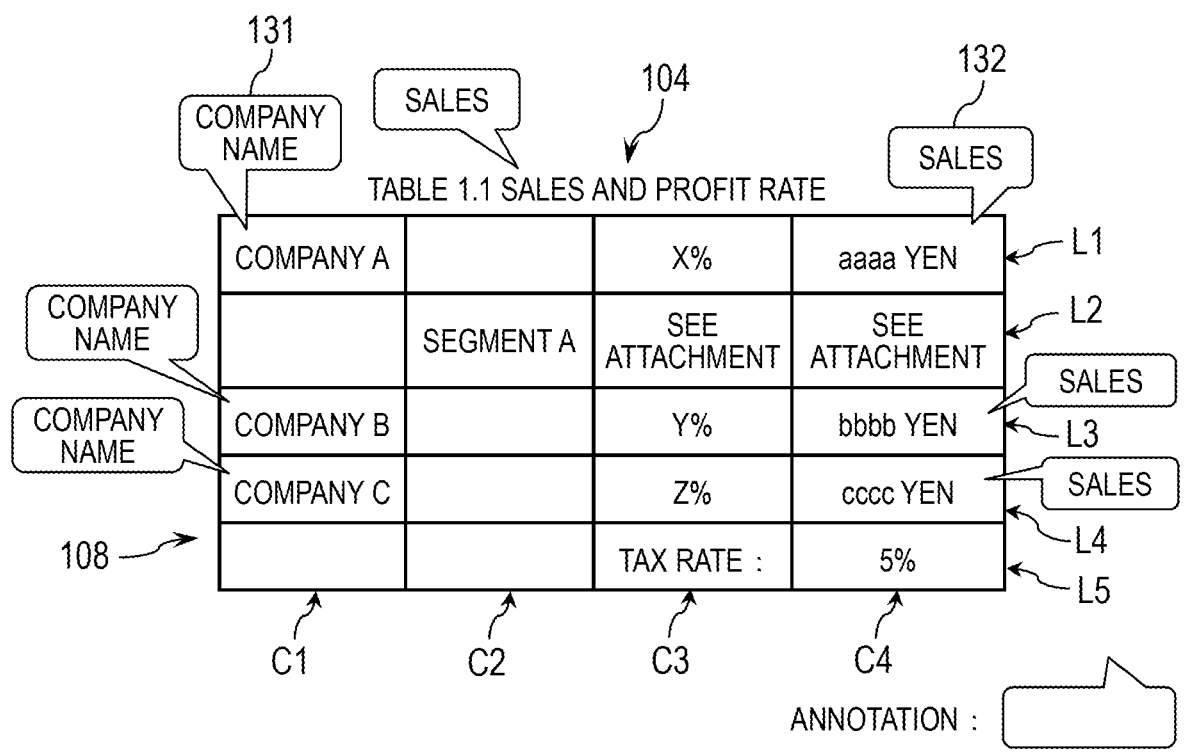
FIG. 8 is an explanatory diagram illustrating Annotation assignment example 4.

FIG. 8 is an explanatory diagram illustrating Annotation assignment example 4. FIG. 8 is an example in which an annotation is assigned to a table 108 using the search keyword group 110. The table 108 is a table made up of 5 rows and four columns in which supplementary explanation is added to the table 105. In the table 108, the rows L2 and L5 and the column C2 are newly added for supplementary explanation. Since the annotation assignment illustrated in FIG. 5 is similarly applied to the table 108, the description thereof will be omitted.

Figure 9:
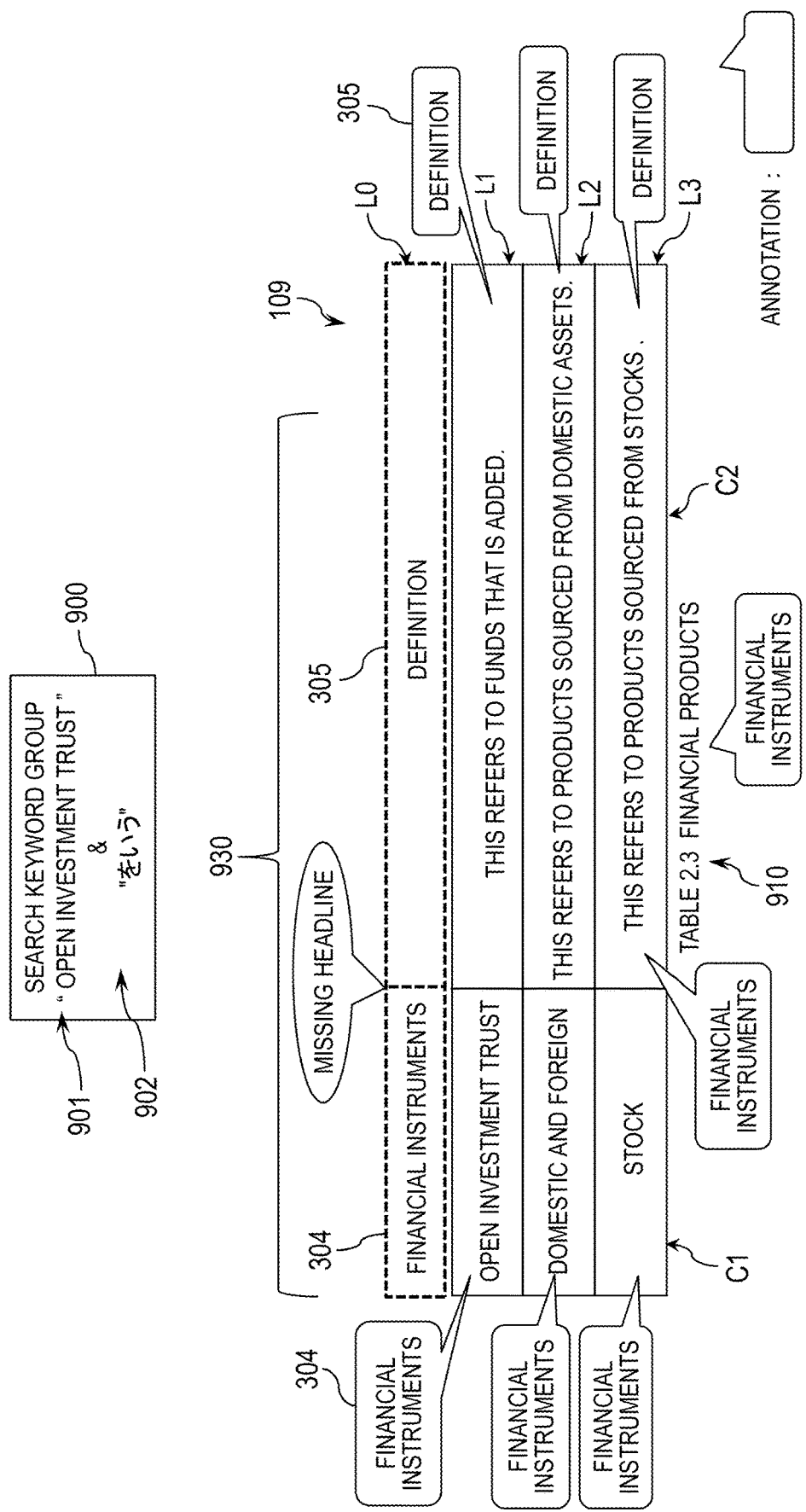
FIG. 9 is an explanatory diagram illustrating Annotation assignment example 5.

FIG. 9 is an explanatory diagram illustrating Annotation assignment example 5. In FIG. 9, a search keyword group 900 is used. The search keyword group 900 includes a search keyword 901 (sometimes denoted as additional investment trust 901) which uses a proper noun indicating a financial product such as an additional investment trust as a character string and a search keyword 902 of which the character string is used in a predicate such as the Japanese character string 1702 that means "refer(s) to" of a sentence indicating a definition of a term.

The additional investment trust 901 is the non-attribute keyword 302 and corresponds to the financial product 304 which is the attribute keyword 301 in the dictionary 225. Therefore, the additional investment trust 901 is also treated as the search keyword 901. Moreover, the table 109 has a matrix structure of three rows and two columns and is a table in which the headline row L0 indicating the titles of the columns C1 and C2 is missing.

The "additional investment trust" in the table 109 corresponds to the financial product 304 which is the attribute keyword 301 serving as the search keyword 901 in the dictionary 225. Therefore, the financial product 304 which is the attribute keyword 301 is assigned to the "additional investment trust" in the table 109 as an annotation. The same is applied to "Domestic and foreign" and "Stocks" in the table 109.

A Japanese character string 1709 in FIG. 17 that means "refers to funds that is added" in the table 109 corresponds to the definition 305 which is the attribute keyword 301 in the table 225, since the Japanese character string 1702 that means "refer(s) to" is included. Therefore, the definition 305 which is the attribute keyword 301 is assigned to the Japanese character string 1709 that means "THIS REFERS TO FUNDS THAT IS ADDED" in the table 109. The same is applied to a Japanese character string 1710 in FIG. 17 that means "THIS REFERS TO PRODUCTS SOURCED FROM DOMESTIC ASSETS" and a Japanese character string 1711 in FIG. 17 that means "THIS REFERS TO PRODUCTS SOURCED FROM STOCKS".

"Table 2.3 Financial product" is a character string 910 indicating the title of the table 109. The "financial product" in the character string 910 is identical to the financial product 304 which is the attribute keyword 301 in the dictionary 225. Therefore, the financial product 304 which is the attribute keyword 301 is assigned to the character string 910 as an annotation. Although not illustrated in the drawing, the character strings indicating the titles of a chapter, a section, and a part including the table 109 are processed in a manner similar to the above.

As described above, although a headline is missing in the table 109, the data acquisition device 200 can search the table 109 as if the headline 930 including the definition 305 and the financial product 304 indicating the attributes of the search keyword group 900 is present as the row L0.

Data Acquisition Processing Procedure Example

Figure 10:
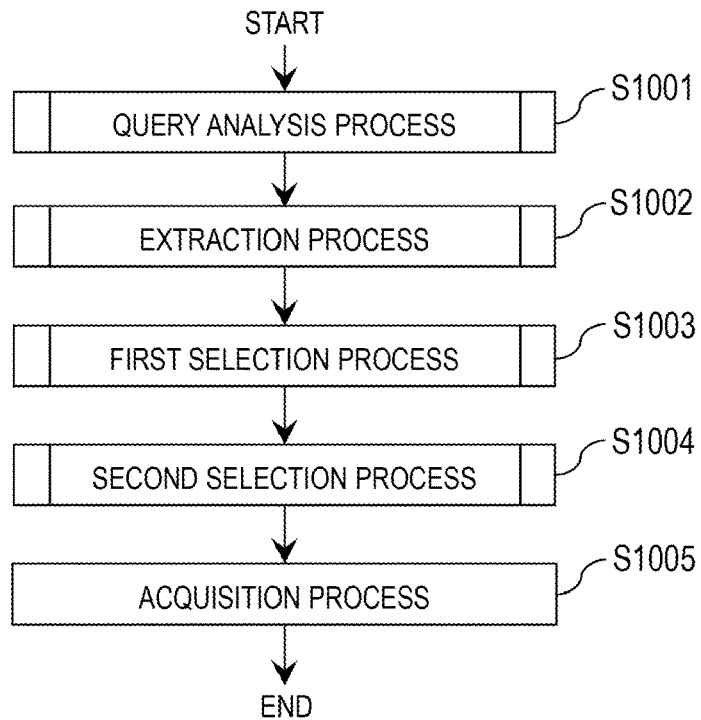
FIG. 10 is a flowchart illustrating a data acquisition processing procedure example executed by the data acquisition device.

FIG. 10 is a flowchart illustrating a data acquisition processing procedure example executed by the data acquisition device 200. The data acquisition device 200 executes a query analysis process (step S1001), an extraction process (step S1002), a first selection process (step S1003), a second selection process (step S1004), and an acquisition process (step S1005).

The query analysis process (step S1001) is executed by the query analysis module 231. The extraction process (step S1002) is executed by the extraction module 232. The first selection process (step S1003) is executed by the first selection module 233. The second selection process (step S1004) is executed by the second selection module 234. The acquisition process (step S1005) is executed by the acquisition module 235.

Figure 11:
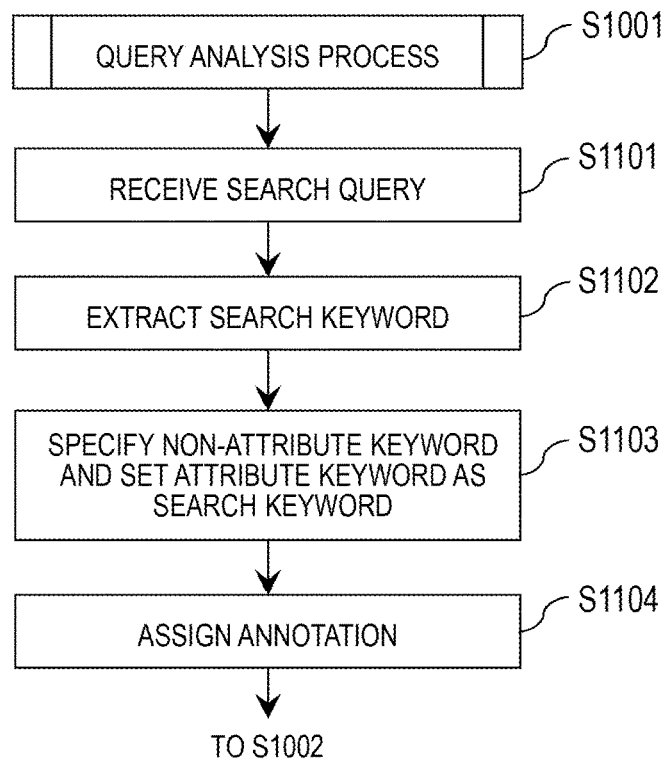
FIG. 11 is a flowchart illustrating a detailed processing procedure example of the query analysis process (step S1001) illustrated in FIG. 10.

FIG. 11 is a flowchart illustrating a detailed processing procedure example of the query analysis process (step S1001) illustrated in FIG. 10. The query analysis process (step S1001) is a process of extracting a search keyword from a retrieval query which is a character string input from an input device and assigning an annotation to the character string in a retrieval target document as illustrated in FIGS. 5 to 9.

In the query analysis process (step S1001), the processor 201 receives the input of a retrieval query from the input device 203 (step S1101). For example, the processor 201 receives a retrieval query of a character string that "wants to know the sales of Company B".

The processor 201 morphologically analyzes the retrieval query received in step S1001 to extract a search keyword (step S1102). In the example of the retrieval query, the Company B 111 and the Sales 112 are extracted as the search keyword group 110.

The processor 201 specifies the non-attribute keyword 302 from the search keyword group extracted in step S1102 by referring to the dictionary 225 and sets the corresponding attribute keyword 301 as the search keyword (step S1103). In the case of the search keyword group 110, the Company B 111 is specified as the non-attribute keyword 302. The attribute keyword 301 corresponding to the Company 111 is the company name 131. Therefore, the processor 201 sets the company name 131 as the search keyword 111.

The processor 201 assigns an annotation to the character string in the retrieval target document 100 (step S1104) and the flow proceeds to the extraction process (step S1002). Specifically, for example, the processor 201 assigns annotations as illustrated in FIGS. 5 to 9. An assigning target of annotations includes at least character strings (intra-table character strings) in the table present in the document 100. Moreover, the assigning target may be character strings (extra-table character strings) present outside the table in the document. The extra-table character string may be all character strings other than the table in the document and may be character strings at a specific position.

For example, the character strings at a specific position are character strings (for example, the character strings 101 to 103) indicating the titles of a chapter, a section, and a part to which the table 105 belongs and a character string (for example, the character string 104) indicating the title of a table positioned above or below the table. Moreover, the character strings at a specific position may include sentences in the chapter, the section, and the part to which the table 105 belongs. Since the character strings at such a specific position are more relevant to the table 105 than the other character strings, the character strings are useful in estimating the missing headline of a table.

Moreover, since an annotation can be assigned to a necessary position being narrowed down, it is possible to prevent increase in the number of unnecessary annotations. On the other hand, by searching the full text in a document without being limited to the character strings at a specific position, it is not necessary to specify an annotation assigning target before assigning annotations and it is possible to simplify the annotation assigning process (step S1104).

Figure 12:
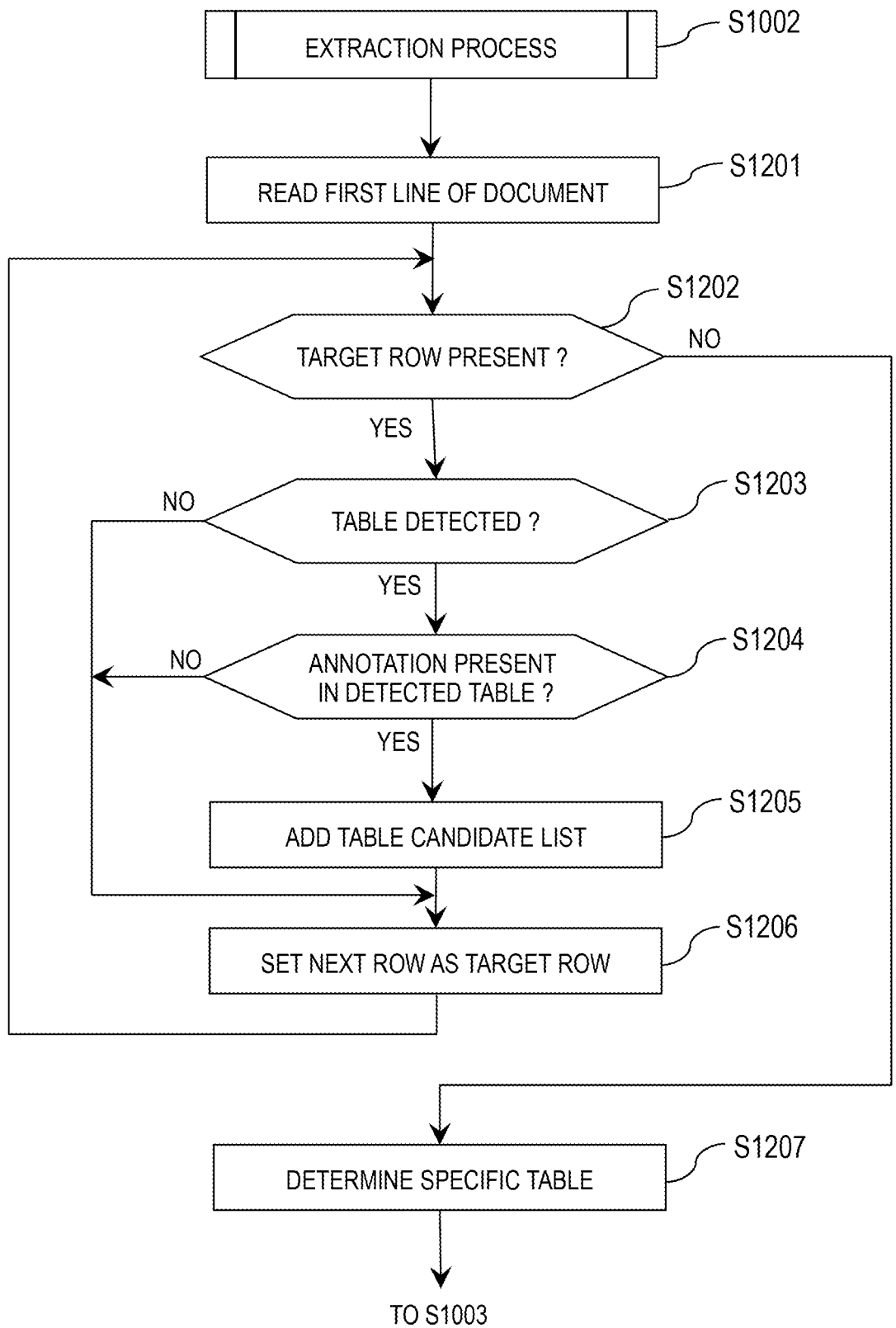
FIG. 12 is a flowchart illustrating a detailed processing procedure example of the extraction process (step S1002) illustrated in FIG. 10.

FIG. 12 is a flowchart illustrating a detailed processing procedure example of the extraction process (step S1002) illustrated in FIG. 10. The extraction process (step S1002) is a process of extracting a table from the document 100 and determining the specific table 105 serving as a data acquisition target.

The processor 201 reads the starting row of the document 100 as a target row for detecting the table 105 (step S1201) and determines whether a target row is present in the document 100 (step S1202). When the target row is present (step S1202: Yes), the processor 201 determines whether the table 105 is detected from the target row (step S1203). For example, when the document is an XML (eXtensible Markup Language) document 100 and a <table> tag is present in the target row, character strings in the tag are detected as a table.

When the table 105 is not detected (step S1203: No), the flow proceeds to step S1206. On the other hand, when the table 105 is detected (step S1203: Yes), the processor 201 determines whether an annotation is assigned to the detected table 105 (step S1204). When no annotation is assigned (step S1204: No), the flow proceeds to step S1206. On the other hand, when an annotation is assigned (step S1204: Yes), the processor 201 adds the table 105 assigned with an annotation to a table candidate list (step S1205), and the flow proceeds to step S1206.

In step S1206, the processor 201 sets the next row as a target row (step S1206) and the flow returns to step S1202. When the table 105 is detected in step S1203 (step S1203: Yes), the processor 201 sets a row next to the last row of the table 105 as the target row. In step S1202, when the target row is not present (step S1202: No), since the entire document 100 has been searched, the processor 201 determines a specific table 105 from the table candidate list (step S1207), and the flow proceeds to the first selection process (step S1003).

In step S1207, for example, the processor 201 determines a table in which the number of assigned annotations is the largest among the table group in the table candidate list as the specific table. Moreover, the processor 201 may determine tables in which the number of assigned annotations is up to the r-th highest rank (r is an integer of 1 or more) among the table group in the table candidate list as the specific table. Moreover, the processor 201 may determine tables in which the number of assigned annotations is a predetermined number of more among the table group in the table candidate list as the specific table. In this manner, it becomes easy to estimate the missing headline from a table as the number of assigned annotations in the table increases.

Figure 13:
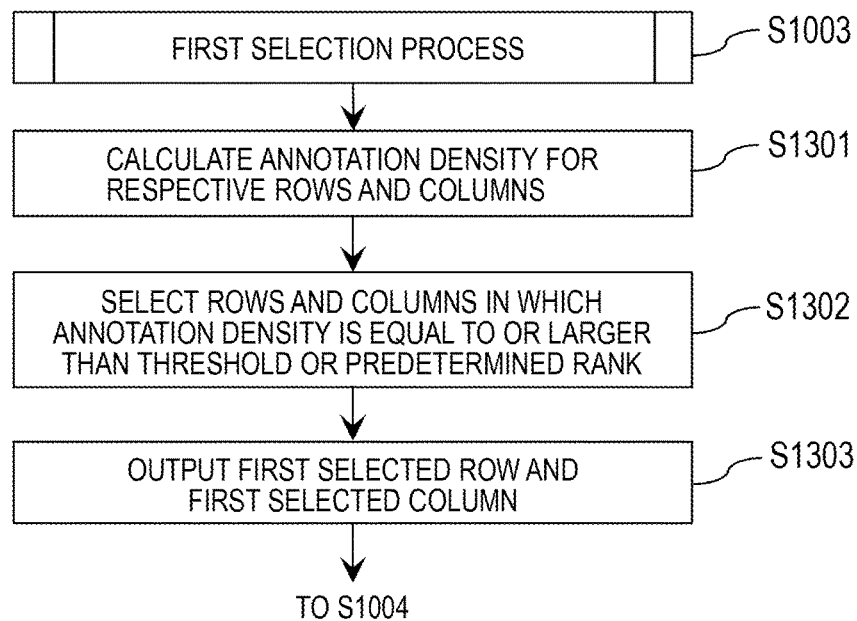
FIG. 13 is a flowchart illustrating a detailed processing procedure example of the first selection process (step S1003) illustrated in FIG. 10.

FIG. 13 is a flowchart illustrating a detailed processing procedure example of the first selection process (step S1003) illustrated in FIG. 10. The processor 201 calculates an annotation density for respective rows and columns of the specific table (step S1301). For example, in the case of the search keyword group 110, "Company B" and "Sales" are the search keywords 111 and 112, respectively, and the company name 131 which is the attribute keyword 301 of the "Company B" is the search keyword 111.

Therefore, the processor 201 calculates an annotation density for respective rows and columns for each of "Company B", "Company name", and "Sales". An annotation density is an index indicating the degree of presence of an annotation in a row or a column, and for example, is a value in which the number of cell groups that constitute a row or a column is a denominator, and the number of same annotations assigned to the corresponding cell group is a nominator. Since there are cases where a plurality of annotations is assigned to one cell, the value of the annotation density may exceed 1.

Referring to FIG. 8, the table 108 has a matrix structure made up of five rows and four columns. Therefore, the rows L1 to L4 each have four cells, and the columns C1 to C5 each have five cells. First, an annotation density of the annotation of the company name 131 will be described.

In the row L1, the number of annotations of the company name 131 is one that is assigned to "Company A". Therefore, the annotation density of the company name 131 of the row L1 is ¼. Since no annotation of the company name 131 is present in the row L2, the annotation density of the company name 131 of the row L2 is 0.

In the row L3, the number of annotations of the company name 131 is one that is assigned to "Company B". Therefore, the annotation density of the company name 131 of the row L3 is ¼. In the row L4, the number of annotations of the company name 131 is one that is assigned to "Company C". Therefore, the annotation density of the company name 131 of the row L4 is ¼. Since no annotation of the company name 131 is present in the row L5, the annotation density of the company name 131 of the row L5 is 0.

In the column C1, the number of annotations of the company name 131 is three that are assigned to "Company A", "Company B", and "Company C". Therefore, the annotation density of the company name 131 of the column C1 is ⅗. Since no annotation of the company name 131 is present in the columns C2 to C4, the annotation density of the company name 131 of the columns C2 to C4 is 0.

Next, an annotation density of the annotation of the sales 132 will be described. In the row L1, the number of annotations of the sales 132 is one that is assigned to "¥aaaa". Therefore, the annotation density of the sales 132 of the row L1 is ¼. Since no annotation of the sales 132 is present in the row L2, the annotation density of the sales 132 of the row L2 is 0.

In the row L3, the number of annotations of the sales 132 is one that is assigned to "¥bbbb". Therefore, the annotation density of the sales 132 of the row L3 is ¼. In the row L4, the number of annotations of the sales 132 is one that is assigned to "¥cccc". Therefore, the annotation density of the sales 132 of the row L4 is ¼. Since no annotation of the sales 132 is present in the row L5, the annotation density of the sales 132 of the row L5 is 0.

Since no annotation of the sales 132 is present in the columns C1 to C3, the annotation density of the sales 132 of the columns C1 to C3 is 0. In the column C4, the number of annotations of the sales 132 is three that are assigned to "¥aaaa", "¥bbbb", and "¥cccc". Therefore, the annotation density of the sales 132 of the column C1 is ⅗.

The processor 201 selects a row or a column in which the annotation density calculated in step S1301 is equal to or larger than a threshold or a predetermined rank (step S1302). For example, in the example of FIG. 8, when the threshold is ½, the processor 201 selects the columns C1 and C4. Since a row in which the annotation density is equal to or larger than the threshold is not present, a row is not selected. The processor 201 outputs a row (hereinafter referred to as a first selected row) and a column (hereinafter referred to as a first selected column) selected in step S1302 as a first selection result (step S1303) and the flow proceeds to a second selection process (step S1004).

Figure 14:
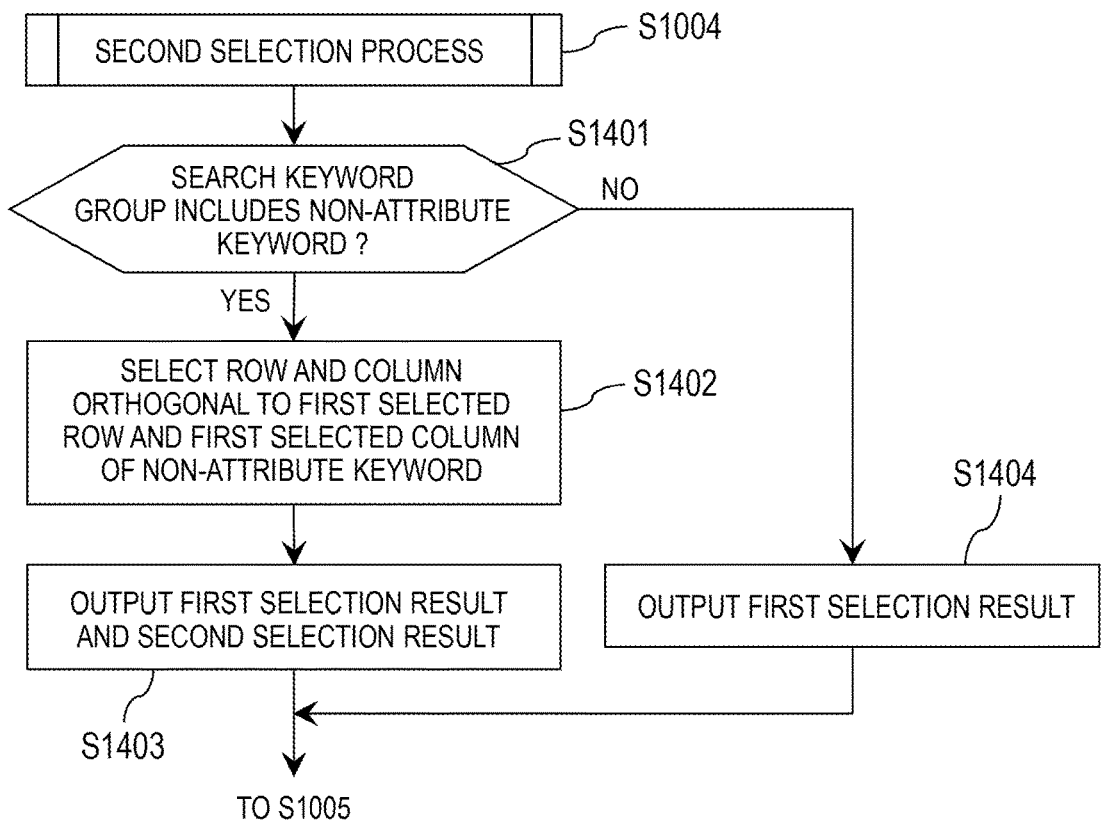
FIG. 14 is a flowchart illustrating a detailed processing procedure example of the second selection process (step S1104) illustrated in FIG. 10.

FIG. 14 is a flowchart illustrating a detailed processing procedure example of the second selection process (step S1104) illustrated in FIG. 10. The processor 201 determines whether a search keyword group includes the non-attribute keyword 302 (step S1401). For example, in the case of the search keyword group 110, the Company B 111 corresponds to the non-attribute keyword 302 when the dictionary 225 is referred to.

When the search keyword group includes the non-attribute keyword 302 (step S1401: Yes), the processor 201 selects a row and a column orthogonal to the first selected row and the first selected column of the non-attribute keyword 302 (step S1402). For example, in the above example, since the first selected column is the columns C1 and C4 of the table 108, the processor 201 selects the row L3 which includes "Company B" which is the non-attribute keyword 302 and is orthogonal to the columns C1 and C4 as the second selected row. In this example, since the first selected row is not present, the second selected column is not selected.

The processor 201 outputs the second selected row and the second selected column selected in step S1402 as the second selection result together with the first selection result (step S1403) and the flow proceeds to an acquisition process (step S1005). In step S1401, when the search keyword group does not include the non-attribute keyword 302 (step S1401: No), the processor 201 outputs the first selection result (step S1404) and the flow proceeds to an acquisition process (step S1005).

FIG. 15 is an explanatory diagram illustrating data acquisition example 1 of the acquisition process (step S1005). In FIG. 15, the table 108 is described by way of an example. As described above, the first selection result is the columns C1 and C4, and the second selection result is the row L3. However, since the Company B 111 corresponds to the non-attribute keyword 302, the column C1 which is the first selection result including the Company B 111 is excluded in the acquisition process (step S1005).

The processor 201 acquires the character string "¥bbbb" of the cell D34 at which the row L3 and the column C4 cross each other from the table 108. The character string "¥bbbb" which is an acquisition result is output to an output device and is output to another computer that can communicate with the data acquisition device 200 via the communication I/F 205.

FIG. 16 is an explanatory diagram illustrating data acquisition example 2 of the acquisition process (step S1005). FIG. 16 is an example in which the non-attribute keyword 302 is not included in the search keyword group (that is, the case of No in step S1411 in FIG. 14). For example, when the search keyword 111 of the search keyword group 110 is not "Company B" but "Company name", this corresponds to the example of FIG. 16. In this case, the first selection result is the first selected columns C1 and C4, and the second selection result is not present.

Therefore, the processor 201 acquires a combined table 1601 in which the first selected columns C1 and C4 are combined as indicated by (A) in the acquisition process (step S1005). Moreover, in the combined table 1601, a row and a column (in this example, the rows L2 and L5) in which no annotation is assigned may be removed to acquire a combined table 1602 as indicated by (B). In this way, it is possible to remove unnecessary information and acquire necessary information from the table 108 appropriately.

As described above, according to the present embodiment, it is possible to acquire necessary data from a table even when a headline that defines the meaning of rows or columns of a table is missing in the table or a plurality of cells are combined and the headline is not sufficient although the headline is present.

In the above-described embodiment, although the dictionary 225 or the dependency pattern 400 is used as the correspondence information, a relationship between the attribute keyword 301 and the non-attribute keyword 302 may be machine-learned by the cell feature learning module 236. For example, the cell feature learning module 236 may generate a learning model using a combination of the non-attribute keyword 302 and correct answer data (the attribute keyword 301) as training data. The cell feature learning module 236 may input a search keyword which is the non-attribute keyword 302 obtained by the query analysis module 231 to the learning model to specify the corresponding attribute keyword 301.

Although the present disclosure has been described with reference to example embodiments, those skilled in the art will recognize that various changes and modifications may be made in form and detail without departing from the spirit and scope of the claimed subject matter.

For example, the above-mentioned embodiments are described in detail for a better understanding of this disclosure, and this disclosure is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A data acquisition device including a processor configured to execute a program and a storage device configured to store the program, wherein
the processor is accessible to correspondence information that defines correspondence between an attribute keyword indicating an attribute and a non-attribute keyword that does not indicate the attribute, and
the processor is configured to execute:
a specifying process of specifying the attribute keyword corresponding to the non-attribute keyword by referring to the correspondence information when the search keyword is the non-attribute keyword with respect to each of a plurality of search keywords;
an assigning process of assigning the search keyword to a character string in a retrieval target document corresponding to the search keyword as an annotation and assigning the attribute keyword to a character string in the retrieval target document corresponding to the attribute keyword specified by the specifying process as the annotation;
an extraction process of extracting a specific table assigned with the annotation by the assigning process from one or more tables present in the retrieval target document;
a first selection process of selecting at least one of a specific row and a specific column relevant to each of the plurality of search keywords from rows and columns that constitute the specific table extracted by the extraction process on the basis of the annotation; and
an acquisition process of acquiring a cell in the specific table specified by a first selection result selected by the first selection process.

2. The data acquisition device according to claim 1, wherein
in the assigning process, the processor is configured to assign the search keyword to a character string in the table corresponding to the search keyword as the annotation and assigns the attribute keyword to a character string in the table corresponding to the attribute keyword as the annotation.

3. The data acquisition device according to claim 2, wherein
in the assigning process, the processor is configured to assign the search keyword to a character string outside the table corresponding to the search keyword as the annotation and assigns the attribute keyword to a character string outside the table corresponding to the attribute keyword as the annotation.

4. The data acquisition device according to claim 3, wherein
the character string outside the table is a character string indicating a title of the table.

5. The data acquisition device according to claim 3, wherein
the character string outside the table is a character string indicating a title of a layer on which the table is present in a hierarchical structure of the retrieval target document.

6. The data acquisition device according to claim 1, wherein
in the extraction process, the processor is configured to extract the specific table on the basis of the number of annotations assigned in the table.

7. The data acquisition device according to claim 6, wherein
in the extraction process, the processor is configured to extract the specific table on the basis of the number of annotations assigned outside the table.

8. The data acquisition device according to claim 7, wherein
the character string outside the table is a character string indicating a title of the table.

9. The data acquisition device according to claim 7, wherein
the character string outside the table is a character string indicating a title of a layer on which the table is present in a hierarchical structure of the retrieval target document.

10. The data acquisition device according to claim 1, wherein
in the first selection process, the processor is configured to calculate a density indicating a presence proportion of the annotation for rows and columns including a specific cell assigned with the annotation in the specific table and selects at least one of a specific row and a specific column relevant to the search keyword on the basis of the density.

11. The data acquisition device according to claim 1, wherein the processor is configured to execute:

a second selection process of selecting a row or a column orthogonal to the first selection result, having a cell including the non-attribute keyword when the plurality of search keywords include the non-attribute keyword, and in the acquisition process, the processor is configured to acquire a cell in the specific table specified by the first selection result and the second selection result obtained in the second selection process.

12. A data acquisition method executed by a data acquisition device including a processor configured to execute a program and a storage device configured to store the program, wherein the processor is accessible to correspondence information that defines correspondence between an attribute keyword indicating an attribute and a non-attribute keyword that does not indicate the attribute, and the data acquisition method includes, as processes executed by the processor:

a specifying process of specifying the attribute keyword corresponding to the non-attribute keyword by referring to the correspondence information when the search keyword is the non-attribute keyword with respect to each of a plurality of search keywords;

an assigning process of assigning the search keyword to a character string in a retrieval target document corresponding to the search keyword as an annotation and assigning the attribute keyword to a character string in the retrieval target document corresponding to the attribute keyword specified by the specifying process as the annotation;

an extraction process of extracting a specific table assigned with the annotation by the assigning process from one or more tables present in the retrieval target document;

a first selection process of selecting at least one of a specific row and a specific column relevant to each of the plurality of search keywords from rows and columns that constitute the specific table extracted by the extraction process on the basis of the annotation; and an acquisition process of acquiring a cell in the specific table specified by a first selection result selected by the first selection process.

13. A non-transitory processor-readable recording medium having a data acquisition program recorded thereon which when executed by a processor causes the processor to execute a method, wherein the processor is accessible to correspondence information that defines correspondence between an attribute keyword indicating an attribute and a non-attribute keyword that does not indicate the attribute, and the data acquisition program causing the processor to execute the method comprising:

a specifying process of specifying the attribute keyword corresponding to the non-attribute keyword by referring to the correspondence information when the search keyword is the non-attribute keyword with respect to each of a plurality of search keywords;

an assigning process of assigning the search keyword to a character string in a retrieval target document corresponding to the search keyword as an annotation and assigning the attribute keyword to a character string in the retrieval target document corresponding to the attribute keyword specified by the specifying process as the annotation;

an extraction process of extracting a specific table assigned with the annotation by the assigning process from one or more tables present in the retrieval target document;

a first selection process of selecting at least one of a specific row and a specific column relevant to each of the plurality of search keywords from rows and columns that constitute the specific table extracted by the extraction process on the basis of the annotation; and an acquisition process of acquiring a cell in the specific table specified by a first selection result selected by the first selection process.

* * * * *